United States Patent
Ito (10) Patent No.: US 9,004,600 B2
(45) Date of Patent: Apr. 14, 2015

(54) SEAT RECLINING APPARATUS FOR VEHICLE

(71) Applicant: Aisin Seiki Kabushiki Kaisha, Kariya-shi (JP)

(72) Inventor: Sadao Ito, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/220,323

(22) Filed: Mar. 20, 2014

(65) Prior Publication Data

US 2014/0292055 A1    Oct. 2, 2014

(30) Foreign Application Priority Data

Mar. 28, 2013  (JP) .................................. 2013-067823

(51) Int. Cl.
  *B60N 2/02*   (2006.01)
  *B60N 2/22*   (2006.01)
  *B60N 2/225*  (2006.01)

(52) U.S. Cl.
  CPC ............ *B60N 2/2213* (2013.01); *B60N 2/2254* (2013.01)

(58) Field of Classification Search
  CPC .............................. B60N 2/252; B60N 2/2254
  USPC .............................................. 297/361.1, 362
  See application file for complete search history.

(56) References Cited

U.S. PATENT DOCUMENTS

| | | | | |
|---|---|---|---|---|
| 5,634,380 | A * | 6/1997 | Scholz et al. ..................... | 74/528 |
| 7,278,689 | B2 * | 10/2007 | Guillouet ........................ | 297/362 |
| 7,497,519 | B2 * | 3/2009 | Dill et al. ........................ | 297/362 |
| 7,607,737 | B2 * | 10/2009 | Liebich et al. ................ | 297/362 |
| 2008/0136242 | A1 * | 6/2008 | Stemmer et al. .............. | 297/362 |
| 2012/0001471 | A1 * | 1/2012 | Wei ................................ | 297/362 |

FOREIGN PATENT DOCUMENTS

JP          2012-46091        3/2012

* cited by examiner

*Primary Examiner* — Philip Gabler
(74) *Attorney, Agent, or Firm* — Oblon, McClelland, Maier & Neustadt, L.L.P.

(57) ABSTRACT

A seat reclining apparatus for a vehicle includes an inner gear plate, an outer gear plate, a first wedge member and a second wedge member positioned within a clearance formed between a peripheral of a center opening of the outer gear plate and a center cylindrical portion of the inner gear plate while outer teeth and inner teeth are meshed with one another, a third wedge member and a fourth wedge member positioned within respective spaces formed between the first wedge member and the center cylindrical portion of the inner gear plate, and the second wedge member and the center cylindrical portion of the inner gear plate, respectively, a first biasing member locking a relative rotation of the inner gear plate and the outer gear plate, and an operating portion allowing the relative rotation of the outer gear plate and the inner gear plate.

11 Claims, 11 Drawing Sheets

SEAT RECLINING APPARATUS FOR VEHICLE

CROSS REFERENCE TO RELATED APPLICATIONS

This application is based on and claims priority under 35 U.S.C. §119 to Japanese Patent Application 2013-067823, filed on Mar. 28, 2013, the entire content of which is incorporated herein by reference.

TECHNICAL FIELD

This disclosure generally relates to a seat reclining apparatus for a vehicle.

BACKGROUND DISCUSSION

A seat reclining apparatus for a vehicle which is stable and stationary when the vehicle vibrates, or oscillates is required in recent years.

A known seat reclining apparatus for a vehicle disclosed in JP2012-046091A (hereinafter, referred to as Patent reference 1) includes an inner gear plate and an outer gear plate which are mounted to the seat reclining apparatus for the vehicle in a relatively rotatable manner while shifting, or changing a meshing position of the inner gear plate and outer gear plate with one another. Because the number of the inner teeth of the inner gear plate is different from the number of the outer teeth of the outer gear plate, a clearance is provided between the inner gear plate and the outer gear plate in a manner that the inner gear plate and the outer gear plate are eccentrically positioned. A pair of wedge members is positioned within the clearance to be in contact with and supported by an inner circumferential surface of a hole portion of the outer gear plate and an outer circumferential surface of a center cylindrical portion of the inner gear plate. A ring spring which locks a relative rotation of the inner gear plate and the outer gear plate by biasing the pair of the wedge members in a direction in which the clearance is narrower so that the pair of the wedge members is in contact with the inner circumferential surface of the hole portion of the outer gear plate while being in contact with the outer circumferential surface of the center cylindrical portion of the inner gear plate at each respective point.

An operating portion is positioned within the clearance and presses and rotates the outer gear plate relative to the inner gear plate by pressingly moving one of the pair of the wedge members in a direction in which the clearance is wider by the rotation of the operating portion. Further, a brake spring is included to prevent the pair of the wedge members from being loosened.

According to the seat reclining apparatus for the vehicle disclosed in Patent reference 1, the pair of the wedge members is in contact with and supported by only two portions which are the inner circumferential surface of the hole portion of the outer gear plate and the outer circumferential surface of the center cylindrical portion of the inner gear plate. Accordingly, in a case where the vehicle vibrates, or oscillates, the pair of the wedge members which locks the relative rotation of the outer gear and the inner gear may be loosened easily and the wedging action does not take place effectively because the pair of the wedge members moves easily.

A need thus exists for a seat reclining apparatus for a vehicle which is not susceptible to the drawback mentioned above.

SUMMARY

According to an aspect of the disclosure, a seat reclining apparatus for a vehicle for connecting a seat back and a seat cushion configuring a seat for the vehicle in a relatively rotatable manner, includes an inner gear plate being provided with inner teeth and a center cylindrical portion and being configured to be joined with the seat back, an outer gear plate being provided with a smaller number of outer teeth than a number of the inner teeth, including a center opening, being rotatably mounted to the inner gear plate while shifting a meshing position relative to the inner gear plate in a state where the center cylindrical portion of the inner gear plate is positioned within the center opening and the outer teeth and the inner teeth are meshed with one another, and being configured to be joined with the seat cushion, a first wedge member and a second wedge member being positioned within a clearance formed between a peripheral of the center opening of the outer gear plate and the center cylindrical portion of the inner gear plate while the outer teeth and the inner teeth are meshed with one another, a third wedge member and a fourth wedge member being positioned within respective spaces formed between the first wedge member and the center cylindrical portion of the inner gear plate, and the second wedge member and the center cylindrical portion of the inner gear plate, respectively, a first biasing member biasing the third wedge member and the fourth wedge member in a direction wherein the respective spaces are narrower while biasing the first wedge member and the second wedge member in the direction wherein the clearance is narrower and locking a relative rotation of the inner gear plate and the outer gear plate, and an operating portion allowing the relative rotation of the outer gear plate and the inner gear plate by shifting one of the third wedge member and the fourth wedge member against biasing force applied by the first biasing member and by rotationally shifting one of the first wedge member and the second wedge member corresponding to a selected one of the third wedge member and the fourth wedge member against biasing force applied by the first biasing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
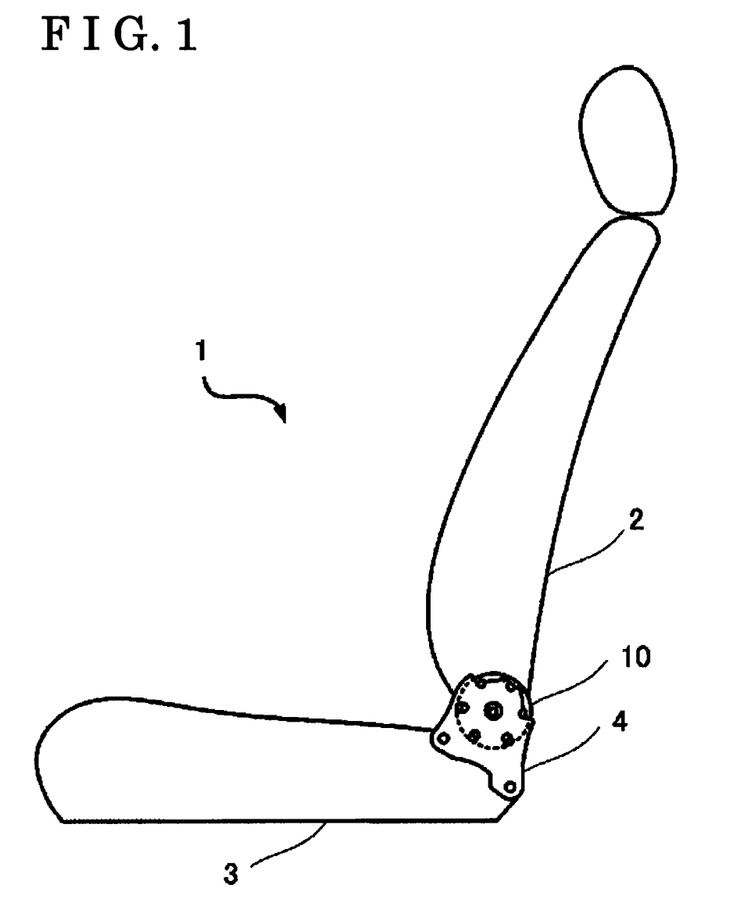
FIG. 1 is a general view of a seat for a vehicle including a seat reclining apparatus according to a first embodiment disclosed here.

Embodiments of a seat reclining apparatus 10 will be explained with reference to drawing figures. As illustrated in FIG. 1, a seat 1 for a vehicle is configured with a seat back 2, a seat cushion 3, a mounting arm 4, and the seat reclining apparatus 10. The seat reclining apparatus 10 includes an inner gear plate 12 and an outer gear plate 13, and inner teeth of the inner gear plate 12 and outer teeth of the outer gear plate 13 are meshed with one another. The outer gear plate 13 is welded and fixed to the mounting arm 4 which is fixed to the seat cushion 3. The inner gear plate 12 is fixed to the seat back 2. Accordingly, the seat reclining apparatus 10 connects the seat back 2 and the seat cushion 3 configuring the seat 1 for the vehicle in a relatively rotatable manner. The seat reclining apparatuses 10 are positioned at opposing sides of the seat 1 for the vehicle.

Figure 2:
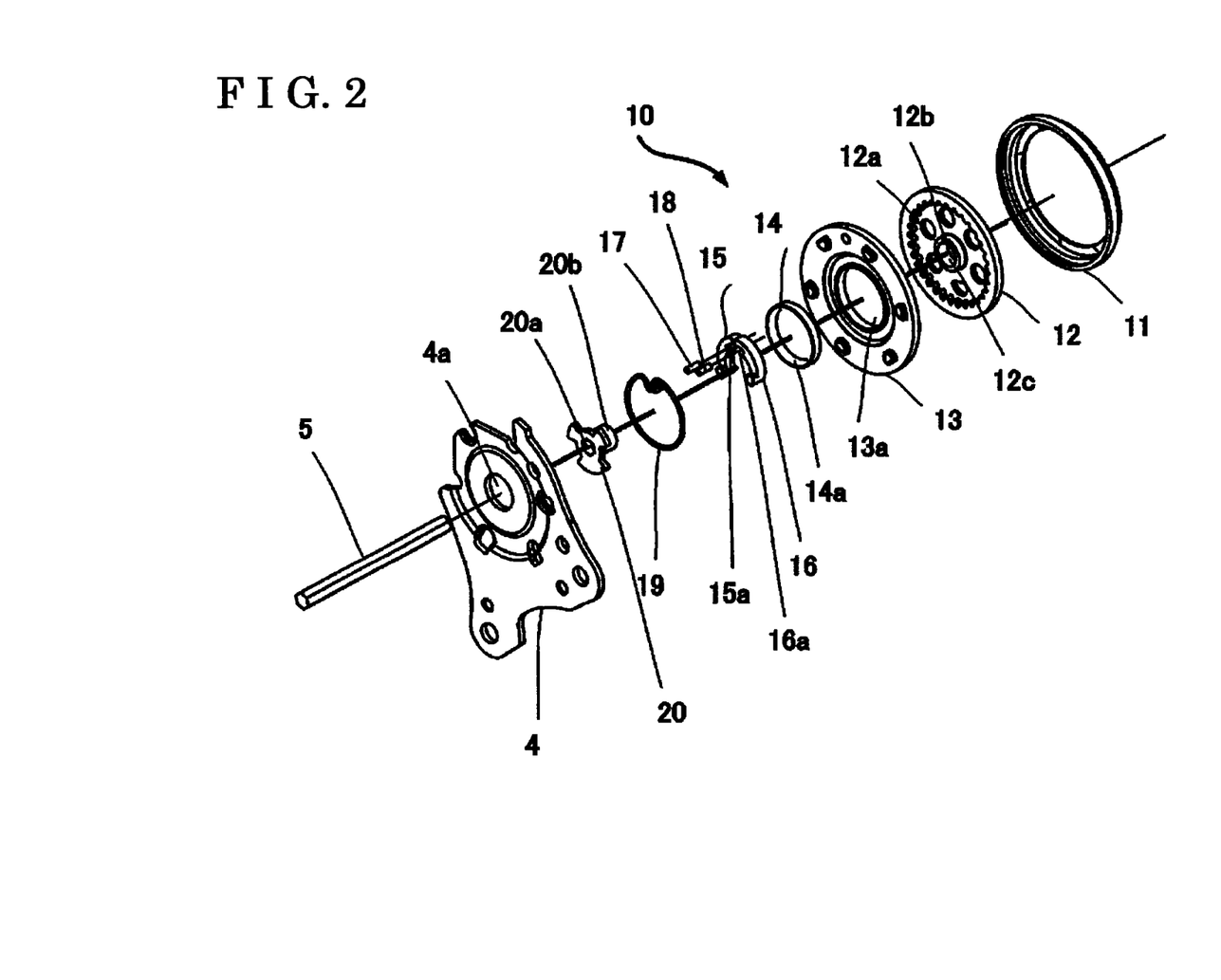
FIG. 2 is an exploded perspective view of the seat reclining apparatus according to the first embodiment of the disclosure.

As illustrated in FIG. 2, the seat reclining apparatus 10 includes a ring member 11, the inner gear plate 12, the outer gear plate 13 and a bush 14. The seat reclining apparatus 10 further includes a first wedge member 15, a second wedge member 16, a third wedge member 17, a fourth wedge member 18, a ring spring 19 serving as a first biasing member and a cam 20 serving as a cam mechanism and an operating portion. The first and second wedge members 15 and 16 serve as a pair while the third and fourth wedge members 17 and 18 serve as a pair.

The ring member 11 rotatably surrounds the inner gear plate 12 and is crimped and fixed to the outer gear plate 13. The ring-shaped bush 14 is press-fitted into a center opening 13a of the outer gear plate 13. The first and second wedge members 15 and 16 are positioned between an outer circumferential surface 12b of a center cylindrical portion 12a of the inner gear plate 12 and an inner circumferential surface 14a of the bush 14 to be in contact with the outer circumferential surface 12b and the inner circumferential surface 14a. Alternatively, the first and second wedge members 15 and 16 may be positioned inside the center opening 13a of the outer gear plate 13 to be directly in contact with an inner circumferential surface of the center opening 13a of the outer gear plate 13 without including the bush 14. The third and fourth wedge members 17 and 18 are positioned between corresponding first and second spaces 15a and 16a provided between the center cylindrical portion 12a of the inner gear plate 12 and the first wedge member 15 and the center cylindrical portion 12a of the inner gear plate 12 and the second wedge member 16, respectively, to be in contact with the outer circumferential surface 12b of the center cylindrical portion 12a of the inner gear plate 12 and respective inner circumferential surfaces of the first and second wedge members 15 and 16. A direction to separate the first and second wedge members 15 and 16 from one another and a direction to separate the third and fourth wedge members 17 and 18 from one another are referred to as a circumferentially outer direction. A direction to move the first and second wedge members 15 and 16 toward one another and a direction to move the third and fourth wedge members 17 and 18 toward one another are referred to as a circumferentially inner direction. The ring spring 19 serving as the first biasing member is mounted such that opposing end portions of the ring spring 19 bias the third and fourth wedge members 17 and 18, respectively, in the circumferentially outer direction to separate the third and fourth wedge members 17 and 18 from one another within the corresponding first and second spaces 15a and 16a, respectively. Because the third and fourth wedge members 17 and 18 are in contact with the first and second wedge members 15 and 16, respectively, the ring spring 19 biases the first and second wedge members 15 and 16 in the circumferentially outer direction to separate the first and second wedge members 15 and 16 from one another via the third and fourth wedge members 17 and 18, respectively. The cam 20 includes a cylindrical portion 20b provided with a hexagonal opening 20a at a center thereof, and the cam 20 is positioned such that the cylindrical portion 20b is positioned inside an opening 12c provided through the center cylindrical portion 12a of the inner gear plate 12. A hexagonal stick-shaped connecting rod 5 serving as an operating portion is connected to the seat reclining apparatus 10 positioned opposite of the seat 1 for the vehicle through the center opening 4a of the mounting arm 4 and the opening 20a of the cam 20.

A circumferential direction described in the description of the disclosure is defined as the circumferential direction about a center of the opening 20a of the cam 20.

Figure 3:
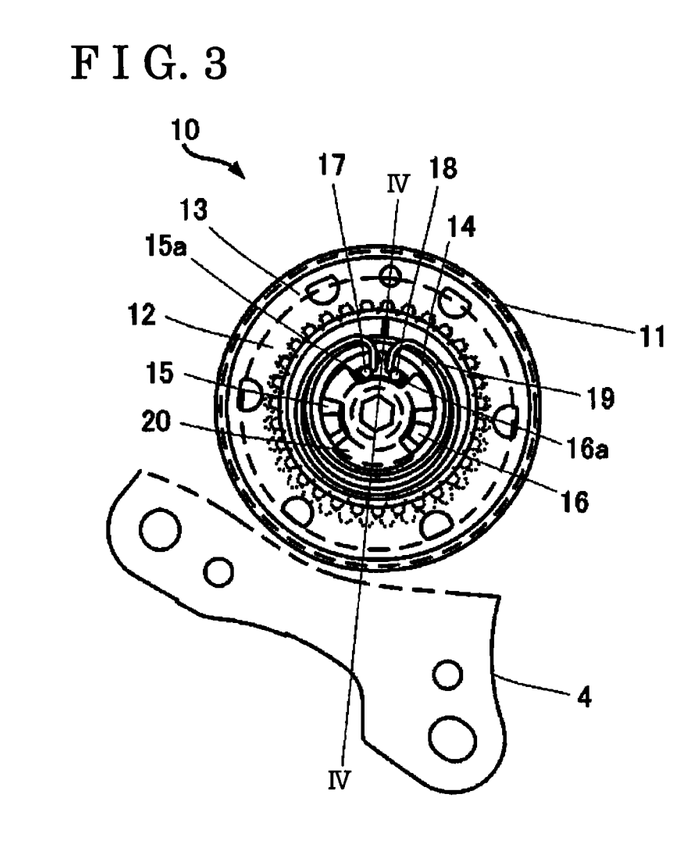
FIG. 3 is a plan view of the seat reclining apparatus according to the first embodiment of the disclosure.

As illustrated in FIG. 3, a portion of the mounting arm 4 is cut out to show an overview of the seat reclining apparatus 10.

According to the seat reclining apparatus 10 of the embodiment, the number of the teeth of the inner gear plate 12 is greater than the number of the teeth of the outer gear plate 13 by, for example, one tooth. Accordingly, the inner gear plate 12 and the outer gear plate 13 are partially meshed with one another as a gear, however, respective center axes are not coaxial with one another. Thus, a clearance is formed between the inner circumferential surface of the center opening 13a of the outer gear plate 13 and the outer circumferential surface 12b of the center cylindrical portion 12a of the inner gear plate 12 in a manner that the outer gear plate 13 and the inner gear plate 12 are eccentrically positioned. The respective inner circumferential surfaces of the first and second wedge members 15 and 16 positioned within the clearance formed between the outer gear plate 13 and the inner gear plate 12 in a manner that the outer gear plate 13 and the inner gear plate 12 are eccentrically positioned are in contact with the outer circumferential surface 12b of the center cylindrical portion 12a of the inner gear plate 12 at, for example, each respective point while being almost entirely in contact with the inner circumferential surface 14a of the bush 14. Accordingly, the first and second wedge members 15 and 16 serve as wedges between the center opening 13a of the outer gear plate 13 and the center cylindrical portion 12a of the inner gear plate 12.

As described above, because the respective center axes of the inner gear plate 12 and the outer gear plate 13 are not coaxial with one another, the respective first and second spaces 15a and 16a provided between the center cylindrical portion 12a of the inner gear plate 12 and the first wedge member 15 and the center cylindrical portion 12a of the inner gear plate 12 and the second wedge member 16, are narrower as being away from one another in the circumferentially outer direction. That is, the first and second spaces 15a and 16a are formed, for example, in a tapered manner. The respective third and fourth wedge members 17 and 18 are in contact with the corresponding first and second wedge members 15 and 16 as well as the outer circumferential surface 12b of the center cylindrical portion 12a of the inner gear plate 12 and are biased by the ring spring 19 in the circumferentially outer direction. Thus, the contact area of the respective third and fourth wedge members 17 and 18 with the corresponding first and second wedge members 15 and 16 is larger than the contact area of the third and fourth wedge members 17 and 18 with the outer circumferential surface 12b of the center cylindrical portion 12a of the inner gear plate 12. Accordingly, the third and fourth wedge members 17 and 18 serve as wedges between the first and second wedge members 15 and 16 and the outer circumferential surface 12b of the center cylindrical portion 12a of the inner gear plate 12.

Because the first and second wedge members 15 and 16 as well as the third and fourth wedge members 17 and 18 serve as wedges, the relative rotation of the inner gear plate 12 and the outer gear plate 13 are locked. In particular, because the seat reclining apparatus 10 of this disclosure includes the third and fourth wedge members 17 and 18, a backlash or play between the inner gear plate 12 and the outer gear plate 13 is eliminated or reduced.

Figure 4:
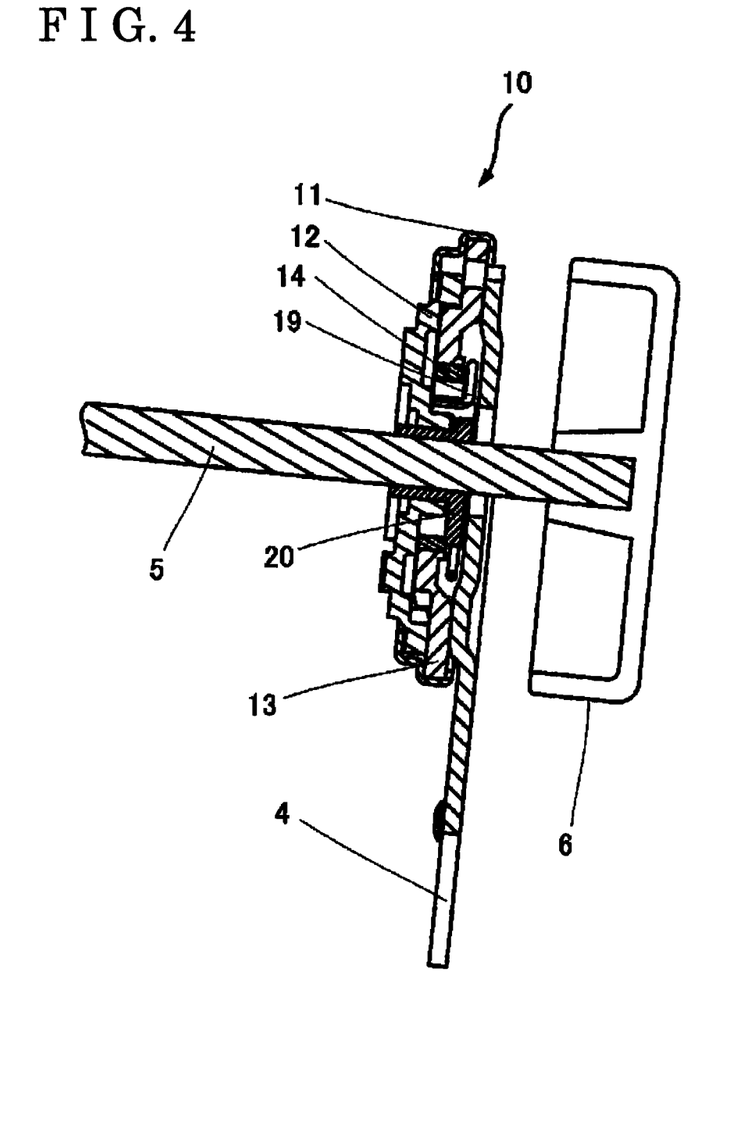
FIG. 4 is a cross-sectional view of the seat reclining apparatus according to the first embodiment taken along line IV-IV in FIG. 3.

As illustrated in FIG. 4, the connecting rod 5 is provided with a handle 6 serving as the operating portion. The rotation of the handle 6 rotates the cam 20 connecting with the connecting rod 5.

Figure 5:
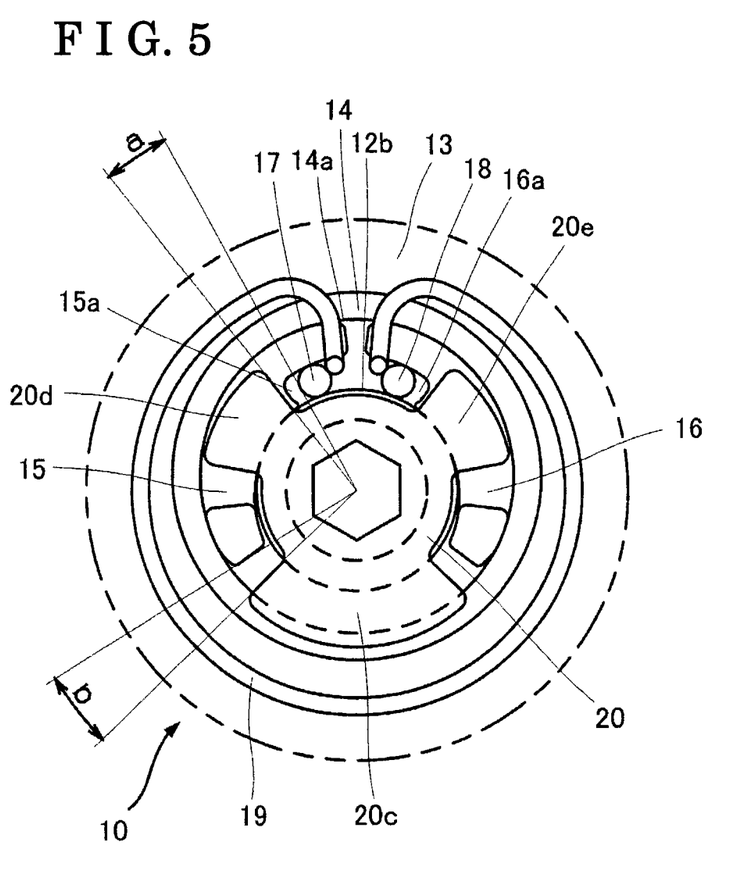
FIG. 5 is a view illustrating a movement of a first wedge member, a second wedge member, a third wedge member, and a fourth wedge member in response to a rotation of a cam of the seat reclining apparatus according to the first embodiment.

As illustrated in FIG. 5, each of the first and second wedge members 15 and 16 is in contact with and supported by, for example, three positions, that are, the outer circumferential surface 12b of the center cylindrical portion 12a of the inner gear plate 12, each of the corresponding third and fourth wedge members 17 and 18, and the inner circumferential surface 14a of the bush 14. Thus, when load, or force is applied to the seat reclining apparatus 10 to recline the seat back 2 backward from a state where the seat reclining apparatus 10 is in a normal state, that is, in a locked state, as illustrated in FIG. 5, each of the first and second wedge members 15 and 16 is still in contact with and supported by, for example, the aforementioned three positions, that are, the outer circumferential surface 12b of the center cylindrical portion 12a of the inner gear plate 12, each of the corresponding third and fourth wedge members 17 and 18, and the inner circumferential surface 14a of the bush 14. Because the first and second wedge members 15 and 16 serve as wedges in a stable and stationary manner, the seat back 2 does not recline backward.

According to the seat reclining apparatus 10 of the first embodiment of the disclosure, the cam 20 includes a first flap portion 20c, a second flap portion 20d and a third flap portion 20e. When the seat reclining apparatus 10 is in the normal state, that is, in the locked state, as illustrated in FIG. 5, the second flap portion 20d and the third wedge member 17 are spaced apart from one another by a clearance angle a while the first flap portion 20c and the first wedge member 15 are spaced apart from one another by a clearance angle b. According to the first embodiment, the clearance angle b is larger than the clearance angle a.

Figure 6:
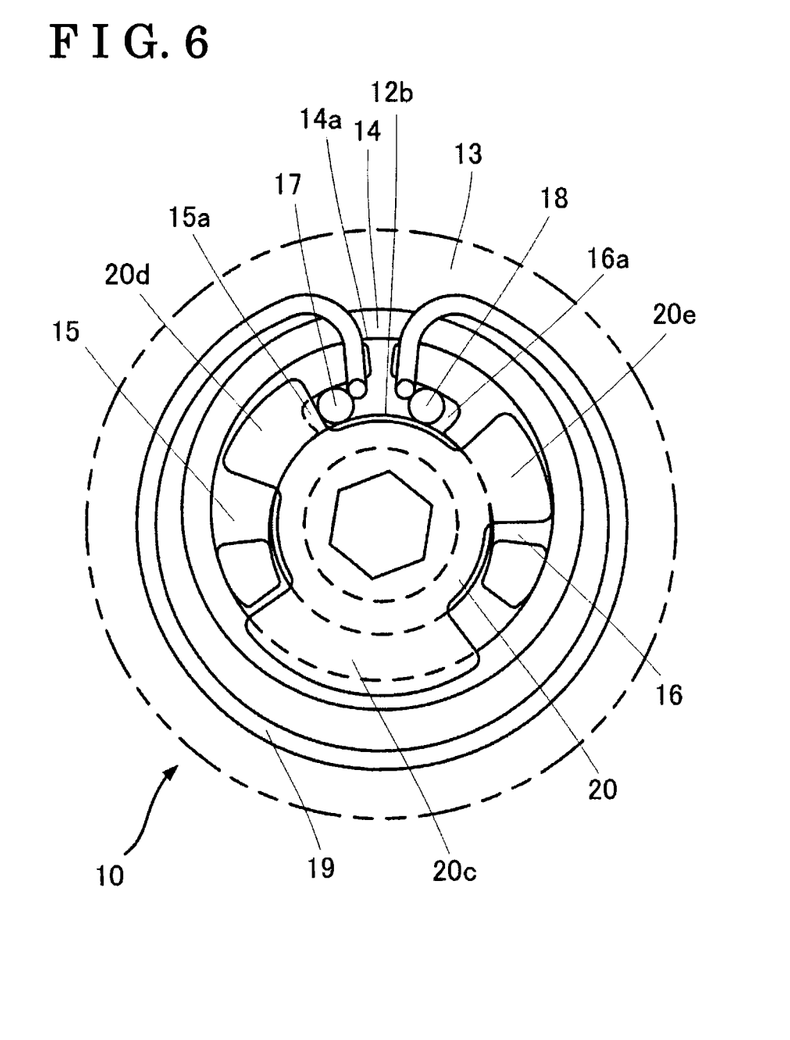
FIG. 6 is another view illustrating the movement of the first wedge member, the second wedge member, the third wedge member, and the fourth wedge member in response to the rotation of the cam of the seat reclining apparatus according to the first embodiment.

As illustrated in FIG. 6, when the cam 20 rotates in a clockwise direction in response to the rotation of the handle 6, the second flap portion 20d comes into contact with the third wedge member 17. When the cam 20 rotates further in the clockwise direction, the second flap portion 20d pressingly moves the third wedge member 17 in the circumferentially inner direction, or the clockwise direction against bias force applied by the ring spring 19 to the third wedge member 17 in the circumferentially outer direction, or an anti-clockwise direction. Because the respective first and second spaces 15a and 16a are wider as being closer to one another in the circumferentially inner direction, the third wedge member 17 does not contact with the first wedge member 15 and the outer circumferential surface 12b of the center cylindrical portion 12a of the inner gear plate 12. In such a state, the third wedge member 17 does not serve as a wedge.

Figure 7:
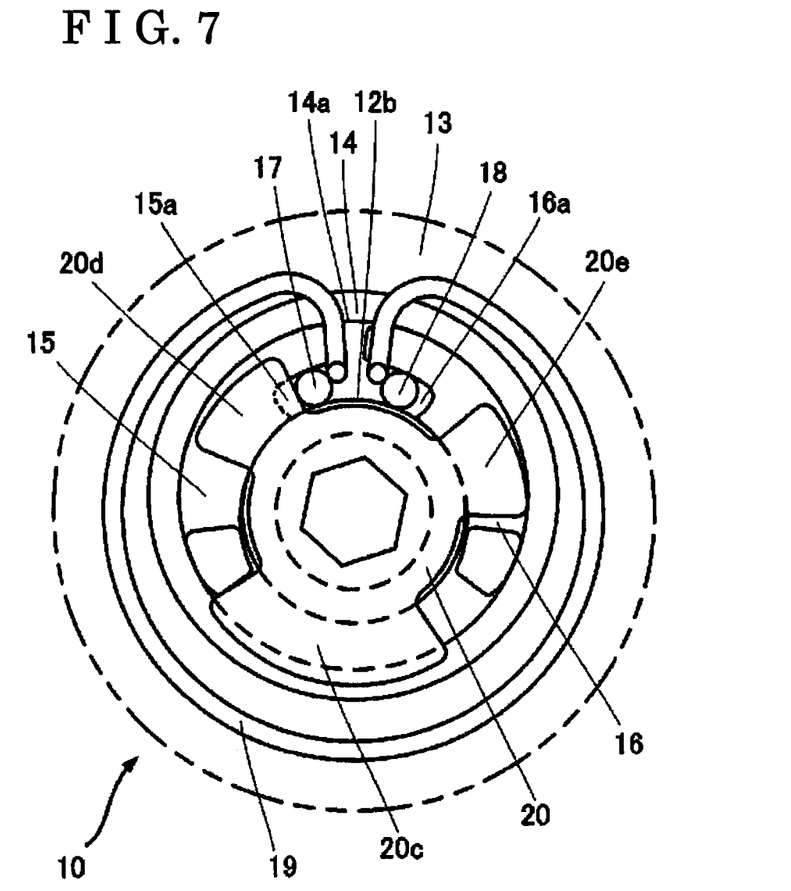
FIG. 7 is still another view illustrating the movement of the first wedge member, the second wedge member, the third wedge member, and the fourth wedge member in response to the rotation of the cam of the seat reclining apparatus according to the first embodiment.

As illustrated in FIG. 7, when the cam 20 rotates in the clockwise direction in response to the further rotation of the handle 6, the first flap portion 20c comes into contact with the first wedge member 15. When the cam 20 rotates further in the clockwise direction, the first flap portion 20c pressingly moves the first wedge member 15 in the circumferentially inner direction, or the clockwise direction and the first wedge member 15 does not serve as a wedge. Accordingly, the first wedge member 15 and the third wedge member 17 do not serve as wedges. Thus, when load, or force is applied to the seat reclining apparatus 10 to recline the seat back 2 rearward, the meshing position of the inner teeth of the inner gear plate 12 and the outer teeth of the outer gear plate 13 is shiftable, or changeable, resulting in that the seat back 2 is reclined rearward.

According to the seat reclining apparatus 10 of the first embodiment, two pairs of the wedge members which are the pair of the first and second wedge members 15 and 16 and the pair of the third and fourth wedge members 17 and 18 are provided. Accordingly, after the wedging action of one of the third and fourth wedge members 17 and 18 is released by the rotation of the cam 20, the wedging action of one of the first and second wedge members 15 and 16 corresponding to the selected one of the third and fourth wedge members 17 and 18 is released. That is, the wedging action provided at the seat reclining apparatus 10 may be released in two steps.

According to the seat reclining apparatus 10 of the first embodiment, two kinds of the wedge members which are the pair of the first and second wedge members 15 and 16 and the pair of the third and fourth wedge members 17 and 18 are provided. Accordingly, the backlash or play of the inner teeth of the inner gear plate 12 and the outer teeth of the outer gear plate 13 may be reduced comparing to the known seat reclining apparatus.

Figure 8:
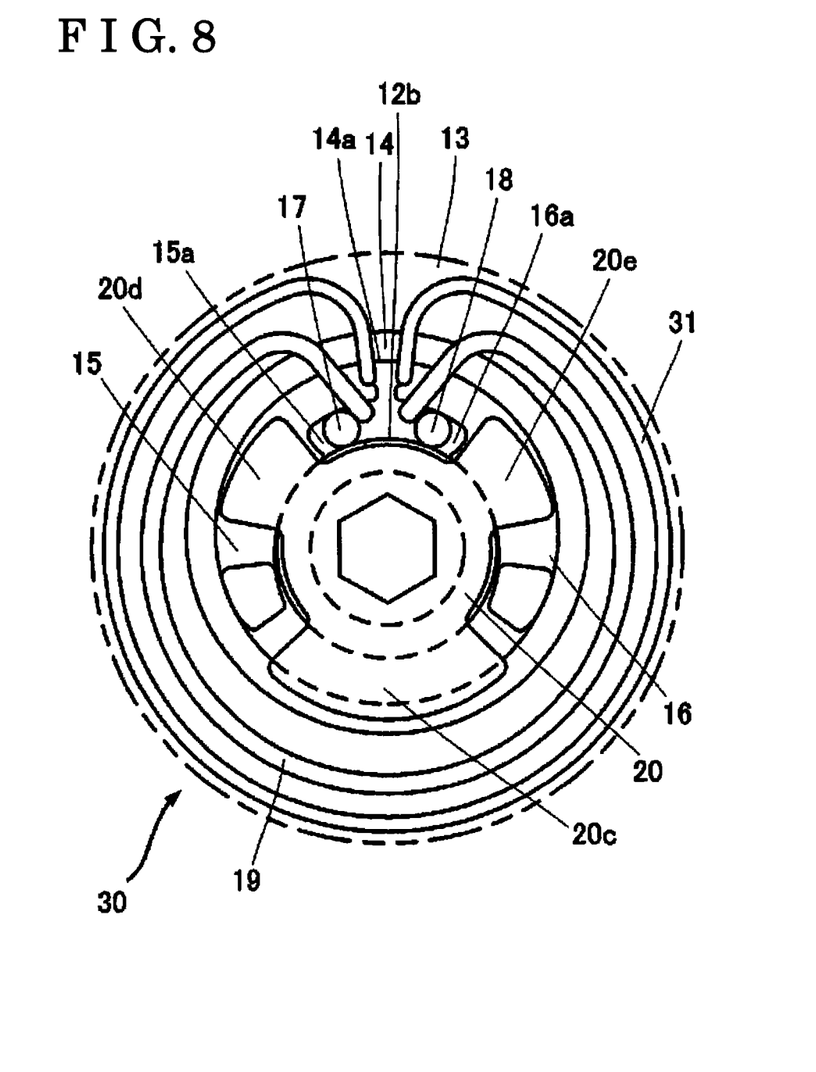
FIG. 8 is a plan view of a seat reclining apparatus according to a second embodiment.

A second embodiment of a seat reclining apparatus 30 is illustrated in FIG. 8. The same components as those described in the seat reclining apparatus 10 of the first embodiment are marked with the same reference numerals, and description of the components will not be repeated.

According to the second embodiment, the seat reclining apparatus 30 includes a ring spring 31 serving as a second biasing member directly biasing the first and second wedge members 15 and 16 in the circumferentially outer direction to separate the first and second wedge members 15 and 16 from one another. Comparing to the seat reclining apparatus 10 of the first embodiment, larger biasing force may be applied to the first and second wedge members 15 and 16. Accordingly, the first and second wedge members 15 and 16 reliably serve as wedges.

Figure 9:
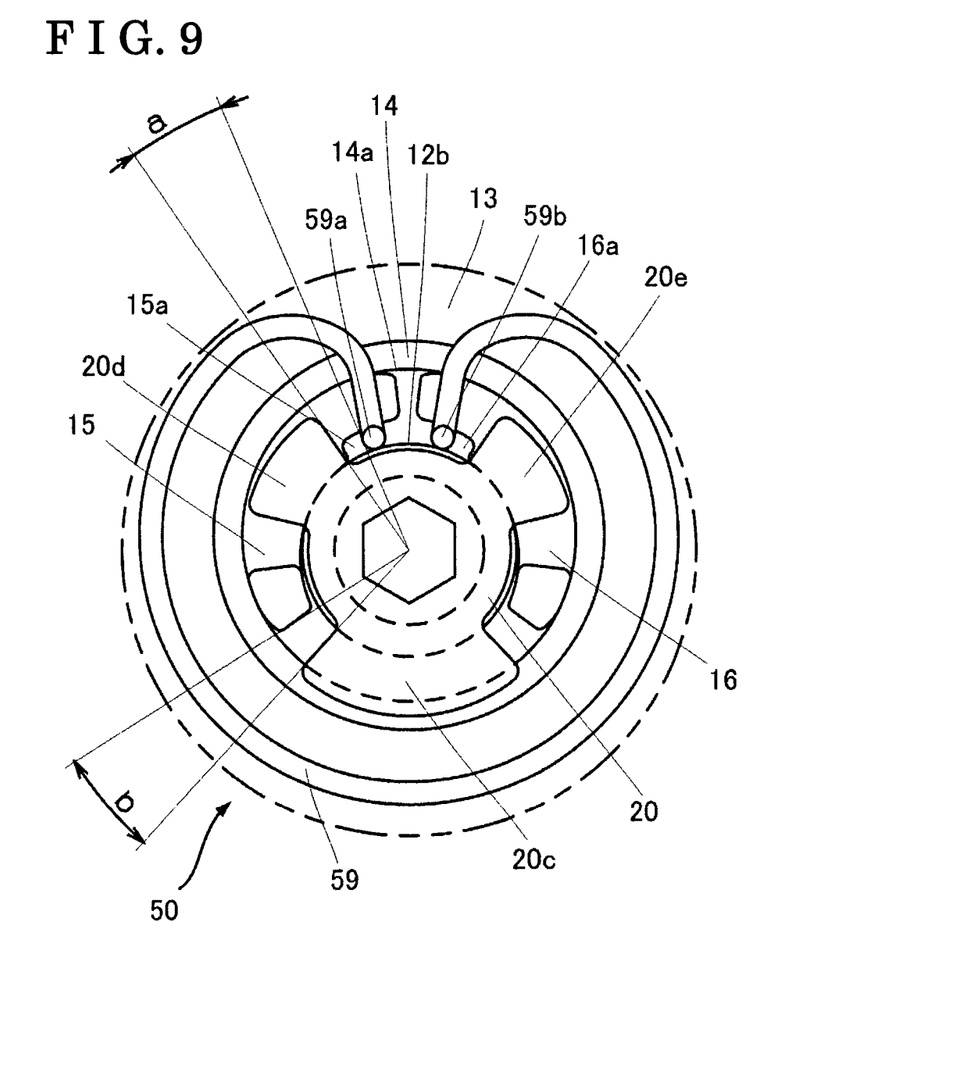
FIG. 9 is a view illustrating a movement of the first wedge member, the second wedge member, the third wedge member, and the fourth wedge member in response to the rotation of the cam of the seat reclining apparatus according to a third embodiment.
Figure 10:
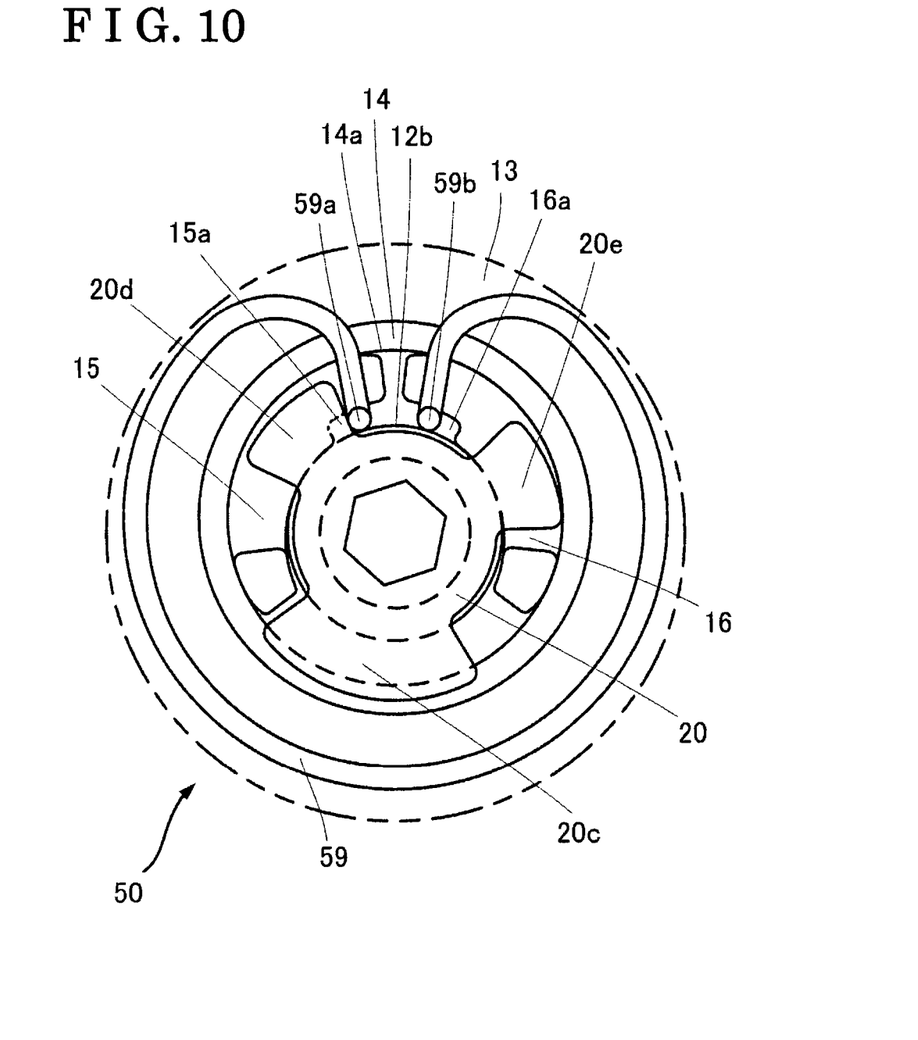
FIG. 10 is another view illustrating the movement of the first wedge member, the second wedge member, the third wedge member, and the fourth wedge member in response to the rotation of the cam of the seat reclining apparatus according to the third embodiment.
Figure 11:
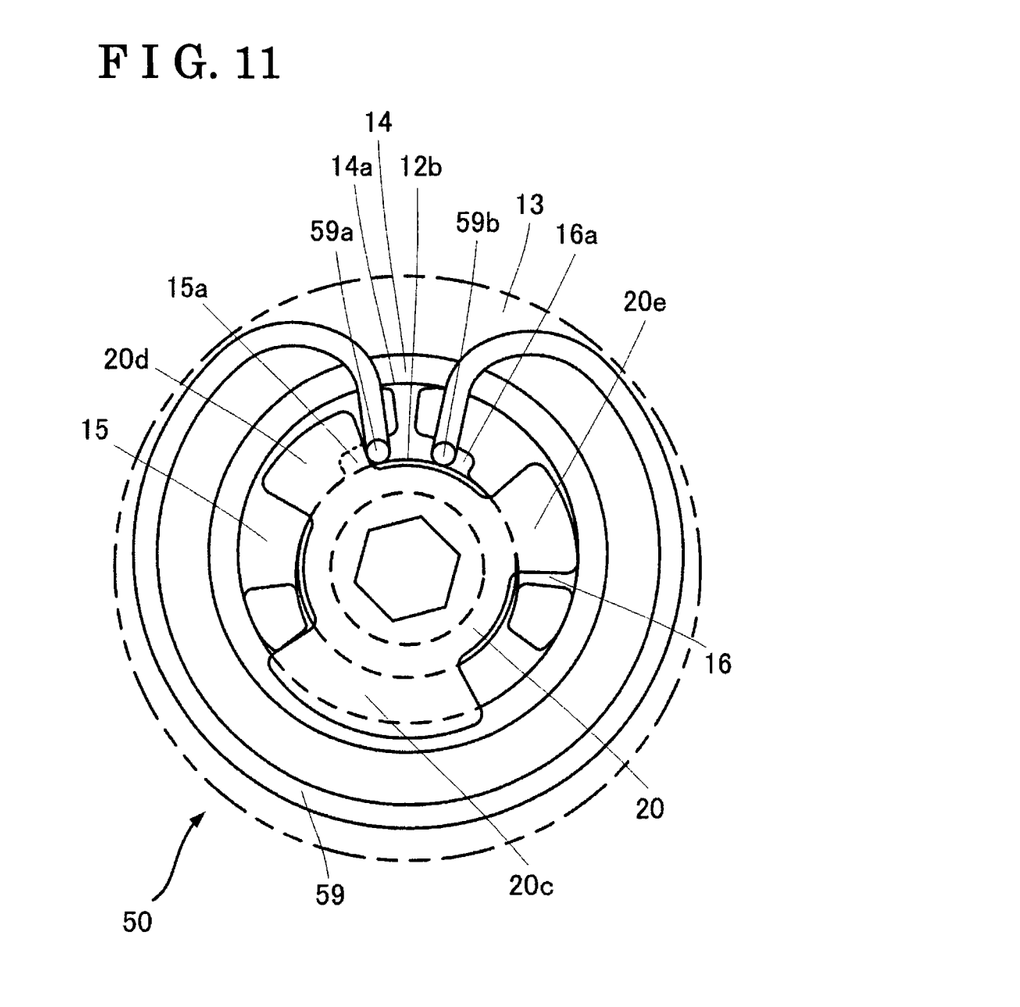
FIG. 11 is still another view illustrating the movement of the first wedge member, the second wedge member, the third wedge member, and the fourth wedge member in response to the rotation of the cam of the seat reclining apparatus according to the third embodiment.

A third embodiment of a seat reclining apparatus 50 is illustrated in FIGS. 9 to 11. The same components as those described in the seat reclining apparatus 10 of the first embodiment are marked with the same reference numerals, and description of the components will not be repeated.

According to the seat reclining apparatus 10 of the first embodiment, the third and fourth wedge members 17, 18 are provided. Alternatively, the seat reclining apparatus 50 of the third embodiment includes a ring spring 59 whose first opposing end portion 59a serving as the third wedge member and second opposing end portion 59b serving as the fourth wedge member are positioned inside the corresponding first and second spaces 15a and 16a provided between the outer circumferential surface 12b of the center cylindrical portion 12a of the inner gear plate 12 and the first wedge member 15 and the outer circumferential surface 12b of the center cylindrical portion 12a of the inner gear plate 12 and the second wedge member 16, respectively.

The respective first and second opposing end portions 59a and 59b of the ring spring 59 are positioned inside the corresponding first and second spaces 15a and 16a, and the contact area of the respective first and second opposing end portions 59a and 59b with the corresponding first and second wedge members 15 and 16 is larger than the contact area of the first and second opposing end portions 59a and 59b with the outer circumferential surface 12b of the center cylindrical portion 12a of the inner gear plate 12 in accordance with the biasing force of the ring spring 59. Accordingly, the first and second opposing end portions 59a and 59b of the ring spring 59 serve as wedges. That is, the first and second opposing end portions 59a and 59b of the ring spring 59 correspond to the third and fourth wedge members 17 and 18 of the first embodiment and may be integrally formed with the ring spring.

In contrast to the seat reclining apparatus 10 of the first embodiment, the ring spring 59 of the seat reclining apparatus 50 of the third embodiment directly biases the first and second wedge members 15 and 16 in the circumferentially outer direction to separate the first and second wedge members 15 and 16 from one another.

Next, the operation of the seat reclining apparatus 50 of the third embodiment will be explained. When the seat reclining apparatus 50 is in the normal state, that is, in the locked state, as illustrated in FIG. 9, the second flap portion 20d and the first opposing end portion 59a of the ring spring 59 are separated from one another by the clearance angle a while the first flap portion 20c and the first wedge member 15 are separated from one another by the clearance angle b. According to the third embodiment, the clearance angle b is larger than the clearance angle a.

As illustrated in FIG. 10, when the cam 20 rotates in the clockwise direction in response to the rotation of the handle 6, the second flap portion 20d comes into contact with the first opposing end portion 59a of the ring spring 59. When the cam 20 rotates further in the clockwise direction, the second flap portion 20d pressingly moves the first opposing end portion 59a of the ring spring 59 in the circumferentially inner direction, or the clockwise direction against bias force applied by the ring spring 59 in the circumferentially outer direction, or the anti-clockwise direction. Because the respective first and second spaces 15a and 16a are wider as being closer to one another in the circumferentially inner direction, the first opposing end portion 59a of the ring spring 59 does not contact with the first wedge member 15 and the outer circumferential surface 12b of the center cylindrical portion 12a of the inner gear plate 12. In such a state, the first opposing end portion 59a of the ring spring 59 does not serving as a wedge.

As illustrated in FIG. 11, when the cam 20 rotates in the clockwise direction in response to the further rotation of the handle 6, the first flap portion 20c comes into contact with the first wedge member 15. When the cam 20 rotates further in the clockwise direction, the first flap portion 20c pressingly moves the first wedge member 15 in the circumferentially inner direction, or the clockwise direction and the first wedge member 15 does not serve as a wedge. In such a state, the first wedge member 15 and the first opposing end portion 59a of the ring spring 59 do not serve as wedges. Thus, when load, or force is applied to the seat reclining apparatus 50 to recline the seat back 2 rearward, the meshing position of the inner teeth of the inner gear plate 12 and the outer teeth of the outer gear plate 13 is shiftable or changeable, resulting in that the seat back 2 is reclined rearward.

According to the seat reclining apparatus 50 of the third embodiment, the pair of the first and second wedge members 15 and 16, the ring spring 59 and the first and second opposing end portions 59a and 59b are formed. After the wedging action of one of the first and second opposing end portions 59a and 59b of the ring spring 59 is released by the rotation of the cam 20, the wedging action of one of the first and second wedge members 15 and 16 corresponding to the selected one of the first and second opposing end portions 59a and 59b is released. That is, the wedging action provided at the seat reclining apparatus 50 may be released in two steps.

According to the seat reclining apparatus 50 of the third embodiment, the similar functions as the seat reclining apparatus 10 of the first embodiment may be obtained without including the pair of the third and fourth wedge members 17 and 18. Thus, according to the seat reclining apparatus 50 of the third embodiment, the number of the components and the man-hours for assembling may be reduced comparing to the seat reclining apparatus 10 of the first embodiment.

As an another example of the seat reclining apparatus 50, an additional ring spring may be applied to bias the first and second wedge members 15 and 16 in the circumferentially outer direction to separate the first and second wedge members 15 and 16 from one another. Accordingly, larger biasing force may be applied to the first and second wedge members 15 and 16, resulting in that the first and second wedge members 15 and 16 serve as wedges more reliably.

According to the aforementioned embodiment, the seat reclining apparatus 10, 30, 50 for the vehicle for connecting the seat back 2 and the seat cushion 3 configuring the seat 1 for the vehicle in a relatively rotatable manner includes the inner gear plate 12 being provided with the inner teeth and the center cylindrical portion 12a and being configured to be joined with the seat back 2, the outer gear plate 13 being provided with the smaller number of the outer teeth than the number of the inner teeth, including the center opening 13a and being rotatably mounted to the inner gear plate 12 while shifting the meshing position relative to the inner gear plate 12 in a state where the center cylindrical portion 12a of the inner gear plate 12 is positioned within the center opening 13a, and the outer teeth and the inner teeth are meshed with one another. The outer gear plate 13 is configured to be joined with the seat cushion 3. The seat reclining apparatus 10, 30, 50 further includes the first wedge member 15 and the second wedge member 16 being positioned within the clearance formed between the peripheral of the center opening 13a of the outer gear plate 13 and the center cylindrical portion 12a of the inner gear plate 12 while the outer teeth and the inner teeth are meshed with one another, the third wedge member 17, 59a and a fourth wedge member 18, 59b being positioned within the respective first and second spaces 16a, 16a formed between the first wedge member 15 and the center cylindrical portion 12a of the inner gear plate 12, and the second wedge member 16 and the center cylindrical portion 12a of the inner gear plate 12, respectively, the first biasing member (the ring spring 19) biasing the third wedge member 17, 59a and the fourth wedge member 18, 59b in the direction wherein the respective first and second spaces 15a, 16a are narrower while biasing the first wedge member 15 and the second wedge member 16 in the direction wherein the clearance is narrower and locking the relative rotation of the inner gear plate 12 and the outer gear plate 13, and the operating portion 5, 6, 20 allowing the relative rotation of the outer gear plate 13 and the inner gear plate 12 by shifting one of the third wedge member 17, 59a and the fourth wedge member 18, 59b against biasing force applied by the first biasing member 19 and by rotationally shifting one of the first wedge member 15 and the second wedge member 16 corresponding to the selected one of the third wedge member 17, 59a and the fourth wedge member 18, 59b against biasing force applied by the first biasing member 19.

According to the seat reclining apparatus 10, 30, 50 of the first, second and third embodiments, the first and second wedge members 15 and 16 serving as a pair are in contact with and supported by, for example, the three positions, that are, the outer circumferential surface 12b of the center cylindrical portion 12a of the inner gear plate 12, the corresponding third and fourth wedge members 17 and 18 serving as a pair, and the inner circumferential surface of the center opening 13a of the outer gear plate 13. Accordingly, in a case where the vehicle vibrates, or oscillates, the first and second wedge members 15 and 16 maintain the wedge action reliably and the seat reclining apparatus 10, 30, 50 is stable and stationary. Thus, when load, or force is applied to the seat reclining apparatus 10, 30, 50 to recline the seat back 2 backward in a state where the seat reclining apparatus 10, 30, 50 is in a normal state, that is, in a locked state, the first and second wedge members 15 and 16 serving as a pair serve as wedges because the first and second wedge members 15 and 16 are in contact with and supported by, for example, the aforementioned three positions, that are, the outer circumferential surface 12b of the center cylindrical portion 12a of the inner gear plate 12, the corresponding third and fourth wedge members 17 and 18 serving as a pair, and the inner circumferential surface of the center opening 13a of the outer gear plate 13.

According to the aforementioned embodiment, each of the third wedge member 17, 59a and the fourth wedge member 18, 59b is biased by the first biasing member (the ring spring 19) so that each of the third wedge member 17, 59a and the fourth wedge member 18, 59b is in contact with each of the corresponding inner circumferential surfaces of the first wedge member 15 and the second wedge member 16 and the outer circumferential surface 12b of the center cylindrical portion 12a of the inner gear plate 12.

According to the aforementioned embodiment, the operating portion 5, 6, 20 includes the cam mechanism (the cam 20) configured to release a wedging action of the third wedge member 17, 59a and the fourth wedge member 18, 59b against biasing force applied by the first biasing member (the ring spring 19) and to release the wedging action by the first wedge member 15 and the second wedge member 16 sequentially against biasing force applied by the first biasing member 19.

According to the aforementioned embodiment, the third wedge member 17, 59a and the fourth wedge member 18, 59b are provided at the first and second opposing end portions 59a, 59b of the first biasing member 19.

According to the aforementioned embodiment, the seat reclining apparatus 30 further includes the second biasing member (the ring spring 31) directly biasing the first wedge member 15 and the second wedge member 16.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus for a vehicle for connecting a seat back and a seat cushion configuring a seat for the vehicle in a relatively rotatable manner, the seat reclining apparatus comprising:

an inner gear plate being provided with inner teeth and a center cylindrical portion, the inner gear plate configured to be joined with the seat back;

an outer gear plate being provided with a smaller number of outer teeth than a number of the inner teeth and including a center opening, the outer gear plate being rotatably mounted to the inner gear plate while shifting a meshing position relative to the inner gear plate in a state where the center cylindrical portion of the inner gear plate is positioned within the center opening and the outer teeth and the inner teeth are meshed with one another, the outer gear plate configured to be joined with the seat cushion;

a first wedge member and a second wedge member being positioned within a clearance formed between a peripheral of the center opening of the outer gear plate and the center cylindrical portion of the inner gear plate while the outer teeth and the inner teeth are meshed with one another;

a third wedge member and a fourth wedge member being positioned within respective spaces formed between the first wedge member and the center cylindrical portion of the inner gear plate, and the second wedge member and the center cylindrical portion of the inner gear plate, respectively;

a first biasing member biasing the third wedge member and the fourth wedge member in a direction wherein the respective spaces are narrower while biasing the first wedge member and the second wedge member in the direction wherein the clearance is narrower, the first biasing member locking a relative rotation of the inner gear plate and the outer gear plate; and an operating portion allowing the relative rotation of the outer gear plate and the inner gear plate by shifting one of the third wedge member and the fourth wedge member against biasing force applied by the first biasing member and by rotationally shifting one of the first wedge member and the second wedge member corresponding to a selected one of the third wedge member and the fourth wedge member against biasing force applied by the first biasing member.

2. The seat reclining apparatus for the vehicle according to claim 1, wherein each of the third wedge member and the fourth wedge member is biased by the first biasing member so that each of the third wedge member and the fourth wedge member is in contact with each of corresponding inner circumferential surfaces of the first wedge member and the second wedge member and an outer circumferential surface of the center cylindrical portion of the inner gear plate.

3. The seat reclining apparatus for the vehicle according to claim 2, wherein the operating portion includes a cam mechanism configured to release a wedging action of the third wedge member and the fourth wedge member against biasing force applied by the first biasing member and to release the wedging action by the first wedge member and the second wedge member sequentially against biasing force applied by the first biasing member.

4. The seat reclining apparatus for the vehicle according to claim 2, wherein the third wedge member and the fourth wedge member are provided at opposing end portions of the first biasing member.

5. The seat reclining apparatus for the vehicle according to claim 2, further comprising:
   a second biasing member directly biasing the first wedge member and the second wedge member.

6. The seat reclining apparatus for the vehicle according to claim 1, wherein the operating portion includes a cam mechanism configured to release a wedging action of the third wedge member and the fourth wedge member against biasing force applied by the first biasing member and to release the wedging action by the first wedge member and the second wedge member sequentially against biasing force applied by the first biasing member.

7. The seat reclining apparatus for the vehicle according to claim 6, wherein the third wedge member and the fourth wedge member are provided at opposing end portions of the first biasing member.

8. The seat reclining apparatus for the vehicle according to claim 6, further comprising:
   a second biasing member directly biasing the first wedge member and the second wedge member.

9. The seat reclining apparatus for the vehicle according to claim 1, wherein the third wedge member and the fourth wedge member are provided at opposing end portions of the first biasing member.

10. The seat reclining apparatus for the vehicle according to claim 9, further comprising:
    a second biasing member directly biasing the first wedge member and the second wedge member.

11. The seat reclining apparatus for the vehicle according to claim 1, further comprising:
    a second biasing member directly biasing the first wedge member and the second wedge member.

* * * * *